May 20, 1941.　　　H. T. KRAFT　　　2,242,216
COUPLING
Filed March 31, 1937
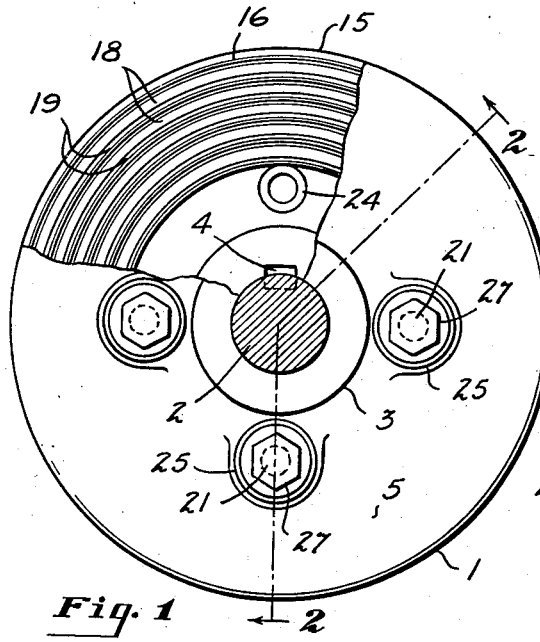
Fig. 1
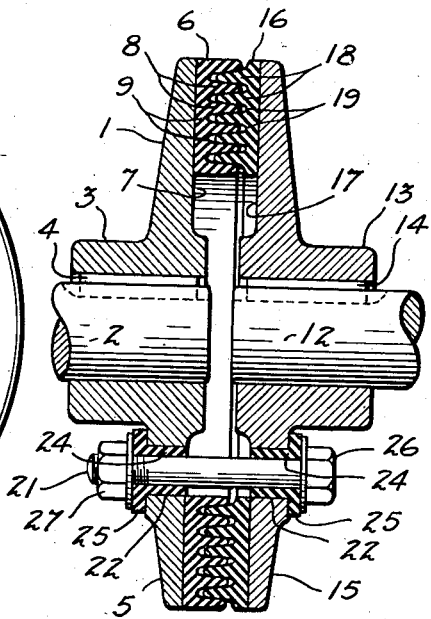
Fig. 2
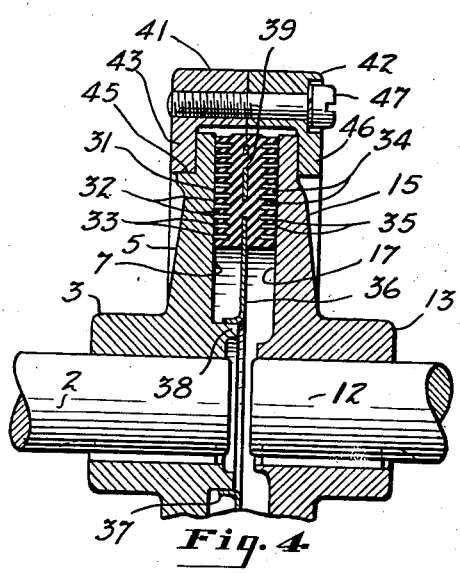
Fig. 4
Fig. 5
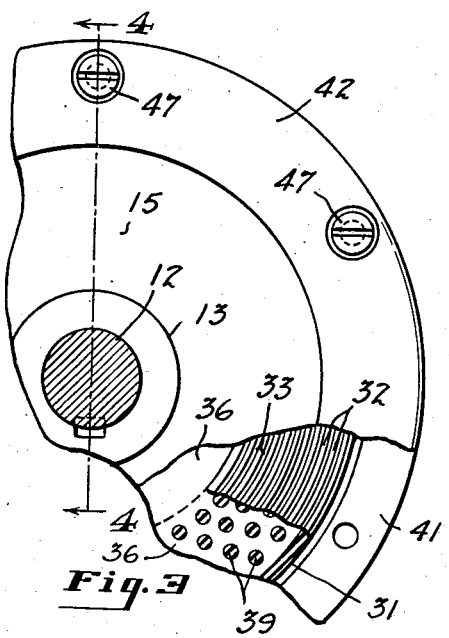
Fig. 3
INVENTOR
Herman T. Kraft
BY Evans + McCoy
ATTORNEYS Patented May 20, 1941

2,242,216

UNITED STATES PATENT OFFICE 2,242,216

COUPLING

Herman T. Kraft, Akron, Ohio, assignor to The General Tire & Rubber Company, Akron, Ohio, a corporation of Ohio Application March 31, 1937, Serial No. 133,975

15 Claims. (Cl. 64—11)

This invention relates to couplings, and more particularly to improved flexible couplings for joining shafts.

An object of this invention is to provide an improved flexible coupling for shafts which will efficiently transmit a smooth flow of power from a source which may be generating power in impulses, such as an internal combustion engine, with minimum frictional losses.

Another object is to provide an improved coupling which will dampen low magnitude, high frequency vibrations without slipping and without sacrificing simplicity in construction and which will yield under momentary conditions of slight overload.

Another object is to provide a flexible coupling which will have a large surface contact between driving and driven members.

Another object is to provide a flexible coupling such that contact between the members will not be broken should there be slight angularity between the shafts.

Other objects and advantages will become apparent from the following detailed description made in connection with the accompanying drawing, in which Figure 1 is a view with parts broken away, of a coupling embodying the present invention;

Fig. 2 is a sectional view of the coupling shown in Fig. 1, taken on the line 2—2 of Fig. 1;

Fig. 3 is a fragmentary view, with parts broken away, showing a modified form of coupling construction;

Fig. 4 is a sectional view of the modified construction shown in Fig. 3 taken on the line 4—4 of Fig. 3;

Fig. 5 is a fragmentary sectional view similar to Fig. 4 of still another form of coupling construction.

Referring to the drawing by numerals of reference, the coupling or joint comprises a driving member 1 carried on drive shaft 2, and a driven member 11 carried on driven shaft 12. The driving and driven members have centrally positioned hubs 3 and 13 respectively which are apertured to receive the shafts. The driving member 1 is secured to the drive shaft 2 by a key 4 received in mating grooves provided in the shaft and hub 3. A disklike flange 5 extends radially outward from the hub 3 of the driving member adjacent the end of the drive shaft 2. Face 7 of the flange 5, which is directed toward the driven member 11, is provided at its outer margin with a friction element 6.

The driven member is also secured against rotation on the driven shaft 12 by means of a key 14 received in grooves in the hub 13 and shaft 12. A radially extending plate flange or driving member 15 is formed on the hub 13 of the driven member adjacent the end of the driven shaft. Face 17 of the flange 15 which is directed toward the driving member 1 has a friction element 16 secured to its outer marginal portion.

The friction elements 6 and 16 are formed with a plurality of endless deformable ribs preferably made of a moderately soft and yieldable material, such as a rubber compound of a consistency similar to that used in vehicle tire treads. The ribs 8 formed in the friction element 6 of the driving member 1 are relatively closely spaced and extend concentrically about the axis of rotation of the driven shaft 2. These ribs are separated by annular grooves or channels 9, which likewise are concentric with the axis of rotation of the coupling and are preferably of substantially greater depth than width for a purpose to be hereinafter explained. The ribs 18 formed in the friction element 16 of the driven member 11 are likewise arranged concentrically with respect to the axis of rotation of the coupling, and are of substantially greater height than thickness.

Annular grooves 19 separating the ribs 18, like the grooves 9 separating the ribs 8, are of substantially greater depth than width, so that the ribs are arranged in closely spaced formation.

Referring to Fig. 2, the ribs 8 of the driving member 1 are arranged to interleaf with the ribs 18 of the driven member so that the ribs 8 may be disposed in the grooves 19 of the driving member and the lateral surfaces of each rib are arranged in frictional engagement with lateral surfaces of ribs of the opposite friction element. Preferably, the ribs 8 of the driving member are of slightly greater thickness than the width of the grooves 19 which are to receive the ribs, in order that the ribs be slightly deformed and there be substantial frictional engagement between the lateral surfaces of the ribs of the driving and driven members. Likewise, the ribs 18 are preferably of greater thickness than the grooves 9. Thus, upon drawing the driving and driven members together so that the ribs of the driven member are received in the grooves of the driving member, and the ribs of the driving member are received in the grooves of the driven member, there is a slight mutual deformation of the several ribs, which serves to retain a substantial frictional contact between the driving and driven members. It is apparent that the area of frictional contact between the members is increased by providing ribs of increased height, since it is the lateral surfaces of the ribs which provide the frictional contact between the driving and driven members.

Normally, each of the ribs 8 and 18 may have a cross section substantially rectangular in shape with the lateral faces of the rib substantially parallel. Upon interleafing of the two sets of ribs, however, the ribs are individually deformed and assume a wedge shaped, or tapered, cross section, as shown in the cross sectional view of Fig. 2.

The friction elements 6 and 16 may be formed, as mentioned above, of a rubber compound having the consistency substantially like that of vehicle tire treads. In this event it is contemplated to secure the friction elements to their respective flanges by vulcanization. The bond between the friction elements and flanges may be increased by suitable roughening of the faces 7 and 17 of the driving and driven members, or by the irregular configurations (not shown) formed thereon.

To retain the ribs of the friction elements 6 and 16 in driving engagement bolts 21 are positioned in apertures 22 in the driving member 1 and apertures 23 in the driven member 11. The apertures 22 and 23 are in alignment and arranged so that the bolts 21 are parallel with the axis of the shafts 2 and 12. Bushings formed of a suitable yieldable material such as rubber are positioned about the bolts 21 to provide a resilient mounting therefor. Cylindrical portions 24 of the bushings are positioned within the apertures 22 and 23 and flangelike portions 25 of the bushings are positioned about marginal portions of the apertures and arranged to overlie areas of the flanges 5 and 15, which would normally be contacted by heads 26 and nuts 27 of the bolts 21. Thus the bolts for holding the driving and driven members together are supported solely by resilient material and engagement between metallic parts of the coupling is avoided. It is not necessary to draw the bolts tight to obtain a driving engagement between the friction elements of the coupling; the function of the bolts is to prevent complete disengagement of the ribs 8 and 18 of the driving and driven members.

Thus, it is a feature of the present invention that slight longitudinal or lateral shifting of the relative positions of either the driving or driven shafts is permitted. As long as portions of the opposite ribs are in frictional engagement, the driving connection is retained. Upon a slight angularity occurring between the driving and driven shafts half of the ribs are forced into more intimate contact to increase their frictional engagement, while the other half of the ribs are slightly withdrawn from one another to decrease the degree of their frictional engagement. Upon slight longitudinal shifting of one shaft with respect to the other, the ribs are either forced into more intimate engagement or slightly withdrawn from between one another, the bolts 21 being arranged to prevent complete disengagement of the ribs.

Low magnitude, high frequency vibrations in the driving side of an ordinary joint tend to be transmitted in corresponding impulses or to cause a "creeping" movement of one member of the joint with respect to the other. In an improved joint embodying the present invention this is prevented. The ribs of the interleafed ring or friction element of this coupling are concentrically positioned in respect to the axis of rotation of the shafts. With the ribs of the structure of a yieldable nature, all vibrations are dampened and a smooth flow of power is obtained at the driven shaft. The vibrations may be said to be absorbed by the plurality of endless flexible ribs; the power intermittently stored and released.

In Figures 3 and 4 is illustrated a modified form of coupling. In this modification the parts corresponding to the parts previously described in connection with the preferred form of coupling illustrated in Figs. 1 and 2 have been indicated by the same numerals of reference. The opposite faces 7 and 17 of the flanges 5 and 15 of the driving and driven members respectively have been machined to provide smooth, preferably flat friction surfaces arranged substantially at right angles to the axis of rotation of the coupling and shafts.

Positioned between the flat friction faces 5 and 15 is a circular friction element or member 31. This element is preferably formed of a relatively soft, yieldable material similar to that which may be used to form the friction elements 6 and 16 previously described and has a series of closely spaced deformable ribs 32 which are arranged concentrically of the axis of rotation of the coupling and positioned to engage the flat friction face 7 of the driving member. These ribs are separated by grooves or spaces 33 which are of substantially greater depth than the distance between adjacent ribs and, like the ribs, extend endlessly around the friction element 31 and are concentric with the axis of rotation of the coupling. A second series of ribs 34 is formed on the opposite side of the friction element 31 and arranged to frictionally engage the face 17 of the flange 15 of the driven member 11. The ribs 34 are likewise separated by deep, narrow grooves or spaces 35 concentric about the axis of rotation of the coupling and which correspond to the grooves 33.

A positioning member 36 retains the friction element 31 between the opposed marginal portions of the flanges 5 and 15 of the coupling and serves to reinforce the friction element against excessive deformation when the coupling is subjected to overload. The positioning member 36 may be formed of a metallic sheet or plate, centrally apertured and provided with a short collar or sleeve 37 arranged to be carried on a circular shoulder 38 formed on the hub 3 of the driving member 1. Marginal portions of the positioning member 36 may be provided with a number of spaced apertures 39 so that the material of the friction element 31 may extend integrally through the positioning member and on both sides thereof.

The driving and driven members of this coupling are clamped together by means of clamping rings 41 and 42. The clamping ring 41 is positioned peripherally about the outer margin of the flange 5 of the driving member 1. It is provided with a circular flange 43 arranged to overhang the flange 5 and be positioned against a mating circular rim and circular shoulder 45 of the flange to secure the calmping ring against wabbling or radial movement. The clamping ring 42 is positioned outwardly of the marginal portion of the driven member 11 and has a flange 46 which overhangs the margin of the flange 15 and is arranged in bearing engagement therewith. Bolts 47 secure the clamping rings 41 and 42 at spaced intervals.

The mode of operation of this coupling is such that, in effect, the member 31 functions as both a driven member and a driving member. Rotational movement is imparted to the member 31 by driving element or member 5 so that the member 31 is a driven member. In turn, the member 31 rotates the element or member 15 and is thus a driving member. The clamping rings 41 and 42 serve to retain the frictional engagement of the ribs 32 on the member 31 with the friction face 7 of the member 5 when the member 31 functions as a driven member and also to retain frictional engagement of the ribs 34 on the member 31 with the face 17 of the member 15 when the member 31 serves as a driving member.

The coupling described in connection with Figs. 3 and 4 is of particular advantage in applications where it is subjected to occasional extreme overloads. Since there is no positive mechanical connection between the drive shaft 2 and driven shaft 12 the power transmission is accomplished entirely through the frictional engagement between the several parts of the coupling. The clamping force exerted on the flanges 5 and 15 by the clamping rings 41 and 42 is adjusted so that the ribs 32 and 34 of the friction element are slightly deformed and thus exert a continual pressure against the faces 7 and 17 of the flanges to maintain frictional engagement between the element 31 and both the driven and driving members. Upon an excessive overload, sufficient to overcome this frictional engagement, the driven member may rotate with respect to the driving member. Such movement of one member of the coupling with respect to the other occurs without injury to any part of the coupling, the only effect being a sliding between the friction element and one or both of the faces 7 and 17. In such rotation of the driving member with respect to the driven member, one of these members will slide with respect to the clamping ring without injury to either.

This construction makes replacement of the frictional element simple. The bolts are loosened and removed. Then the collar may be taken off and the damaged or worn ring may be replaced.

In Fig. 5 is illustrated a modification of a coupling constructed similarly to the coupling illustrated in Figs. 4 and 3. In this modification the parts corresponding to those previously described have been indicated by the same numerals of reference. The face 7 of the driving member flange is formed into a plurality of annular outstanding V-shaped ribs 51 which are arranged concentrically with respect to the axis of rotation of the coupling. The face 17 of the flange of the driven member 11 is provided with a friction element 52 formed with a plurality of outstanding circumferentially arranged ribs 53. These ribs are likewise arranged concentrically with the axis of rotation of the coupling and fit in interleaved relation with the V-shaped ribs 51 of the driving member. The friction element 52 and ribs 53 are formed of resilient, yieldable material such as mentioned in connection with the friction elements 6, 16 and 31 previously described and may be secured to the face 17 of the driven member 11 by any suitable means such as vulcanization. The clamping rings 41 and 42 are arranged to force the ribs 53 into frictional engagement with the V-shaped ribs 51 so that the resilient, yieldable material such as rubber of which the ribs 53 are formed may conform to substantially the exact contour of the ribs 51 and provide an efficient frictional engagement between the driving and driven members.

Thus, the present invention provides new and improved couplings for joining the ends of shafts. These couplings are adapted to absorb vibrations which may occur in either the driving or driven shaft, without objectionable loss of power and which will not cause excessive deterioration of the parts of the coupling.

The present invention also provides a coupling which will accommodate slight angularity and longitudinal movement between driven and driving shafts.

In addition, a coupling is provided which will not be injured by occasional extreme overloads and in which the frictional driving element may be easily and economically replaced when worn.

The particular forms and constructions of apparatus shown and described, and the particular procedure set forth, are presented for purposes of explanation and illustration and various modifications of the apparatus and procedure can be made without departing from my invention as defined in the appended claims.

What I claim is:

1. A shaft coupling having a coupling member secured on a driving element, a coupling member secured on a driven element, a friction member disposed between said members, said friction member having a series of closely spaced annular rubber ribs arranged to frictionally engage a friction face on one of said coupling members, said ribs being individually laterally unstable and normally having edge portions only in engagement with said friction face, and means for holding the ribs in engagement with said face.

2. A shaft coupling having a coupling member secured on a driving element, a coupling member secured on a driven element, a friction member disposed between said members, said friction member having closely spaced annular deformable rubber ribs arranged to frictionally engage faces on the coupling members whereby the driven element may be yieldably actuated by the driving member, said ribs being individually laterally unstable and normally having edge portions only in engagement with said friction faces, and means for holding the ribs in engagement with the faces.

3. A shaft coupling having a coupling member secured on a driving element, a coupling member secured on a driven element, a friction member disposed between said members, said friction member having a series of closely spaced annular rubber ribs arranged to frictionally engage a friction face on one of said coupling members and to be driven by the other of said coupling members, said ribs being individually laterally unstable and normally having edge portions only in engagement with said friction face, and a clamping ring arranged to peripherally encircle the members to hold the ribs in engagement with said face.

4. A shaft coupling having a coupling member secured on a driving element, a coupling member secured on a driven element, a friction member disposed between said members, said friction member having a series of closely spaced annular rubber ribs arranged to frictionally engage a friction face on one of said coupling members and to be driven by the other of said coupling members, said ribs being individually laterally unstable and normally having edge portions only in engagement with said friction face, and ring elements peripherally encircling the members and arranged to be clamped together to retain the ribs in engagement with said face.

5. A shaft coupling having a coupling member secured on a driving element, a coupling member secured on a driven element, a friction member disposed between said members, said friction member having a series of closely spaced annular rubber ribs arranged to frictionally engage a friction face on one of said coupling members and to be driven by the other of said coupling members, said ribs being individually laterally unstable and normally having edge portions only in engagement with said friction face, said ribs being separated from one another by distances less than the thickness of the ribs.

6. A shaft coupling having a coupling member secured on a driving element, a coupling member secured on a driven element, a friction member disposed between said members, said friction member having a series of closely spaced annular rubber ribs arranged to frictionally engage a friction face on one of said coupling members and to be driven by the other of said coupling members, said ribs being individually laterally unstable and normally having edge portions only in engagement with said friction face, said ribs being separated from one another by spaces of greater depth than the distance between adjacent ribs.

7. A shaft coupling having a coupling member secured on a driving element, a coupling member secured on a driven element, a friction member disposed between said members, said friction member having a series of closely spaced annular rubber ribs arranged to frictionally engage a friction face on one of said coupling members, said ribs being individually laterally unstable and normally having edge portions only in engagement with said friction face, and said ribs being separated from one another by spaces of greater depth than the distance between adjacent ribs, said distance being less than the thickness of the ribs.

8. A flexible coupling for joining rotatable shafts, comprising a pair of driving and driven members to be rigidly secured to the ends of aligned shafts and in substantially opposed parallel relation with respect to one another, a deformable friction member disposed between said members to yieldingly connect the latter, said friction member being formed of a resilient and elastic rubber composition, said friction member having formed thereon a multiplicity of substantially parallel integral closely spaced deformable rubber ribs of individually greater height than thickness and individually laterally unstable, said rubber ribs being circular in form and extending endlessly around the friction member and arranged concentrically with respect to one another around the axis of rotation of the coupling.

9. In a flexible coupling for joining aligned ends of rotatable shafts, a friction member comprising a rubber annulus having integrally formed thereon a multiplicity of substantially circular, concentrically arranged, deformable rubber ribs, said ribs being individually laterally unstable and normally extending substantially axially from the annulus, and a metallic spider embedded in the rubber annulus extending radially inwardly therefrom.

10. In a flexible coupling, a driving member and a driven member, each provided with a substantially annular friction surface, the friction surface of one member being normally disposed in substantially parallel relation to the friction surface of the other member, and a resilient rubber friction member of annular form disposed between said surfaces, said friction member having formed on each of opposite sides thereof a group of integral, closely spaced, deformable ribs of individually greater height than thickness and individually laterally unstable, said rubber ribs being annular in form and extending substantially endlessly around the friction member, the group of ribs on one side of the friction member being arranged to engage the friction surface on the driving member and the group of ribs on the other side of the friction member being arranged to engage the friction surface on the driven member.

11. A coupling of the character described comprising a pair of normally axially aligned shafts, flanges on the adjacent ends of the shafts, said flanges having surfaces spaced apart and substantially parallel when the shafts are axially aligned, a rubber member interposed between said surfaces of the flanges, and a shell engaged over the flanges and the rubber member and having means engaging in back of the flanges to hold the same together with the rubber member in compression therebetween, said shell being larger in diameter than the flanges so as to allow limited axial offset of the shafts and so engaging the flanges as to enable axial misalignment of the shafts.

12. A coupling assembly comprising a pair of spaced rotatable members having radially extending flanges formed with friction faces disposed in confronting relation to one another, a resilient and deformable friction element disposed between the members and in frictional engagement with said faces, and a shell extending between the members and having radially disposed flanges engaged behind the flanges of the rotatable members to hold the same with the friction element compressed between the faces.

13. A coupling of the character described comprising a pair of shafts, a driving member on one shaft, a driven member on the other shaft, said driving and driven members having spaced apart substantially parallel opposing surfaces when the shafts are axially aligned, a rubber friction element disposed between the driving and driven members with the opposite ends thereof frictionally engaging said opposite surfaces, and a clamping member extending between the driving and driven members, said clamping member being arranged to hold the driving and driven members together with the rubber element compressed between said surfaces, and there being a clearance and a sliding fit in the connection between the clamping member and the driving and driven members to accommodate axial misalignment and axial offset of the shafts.

14. A coupling assembly comprising a pair of spaced rotatable members having friction faces disposed in confronting relation to one another, a resilient and deformable friction element disposed between the members and in engagement with said faces, and a tie element extending between the members to hold the same with the friction element compressed between the faces, there being non-rigid connection between the tie element and each rotatable member to permit limited axial offset of the rotatable members.

15. A coupling assembly comprising a pair of spaced rotatable members having radially extending flanges formed with faces disposed in confronting relation to one another, a resilient and deformable drive element disposed between the members and in engagement with said faces, and a shell extending between the members and having radially disposed flanges engaged behind the flanges of the rotatable members to hold the same with the drive element compressed between the faces.

HERMAN T. KRAFT.